Patented Jan. 5, 1926.

1,568,669

UNITED STATES PATENT OFFICE.

CLOICE B. HULL, OF CLEVELAND, OHIO.

SOLDERING SOLUTION.

No Drawing.   Application filed October 17, 1924. Serial No. 744,255.

*To all whom it may concern:*

Be it known that I, CLOICE B. HULL, a citizen of the United States, residing at Cleveland, in the county of Cuyahoga and State of Ohio, have invented a new and useful Soldering Solution, of which the following is a specification.

This invention relates to improvements in soldering solutions and more particularly that type of solution used to cause the solder to adhere to the metal to which it is applied.

Heretofore various compounds have been used, many of which involved an acid such as stearic acid and a rosin for this purpose but these materials are open to various objections for the reason that the compound will not easily flow unless pre-heated to a desired temperature. Such materials are difficult to work on tin surfaces or cause oxidation to set in which, among other objections, renders the device unsatisfactory for certain classes of work.

It is, therefore, one of the objects of the present invention to provide a more reliable and efficient soldering solution in a liquid form which will easily flow to all parts of the metal to be soldered and form a perfect flux for all metals except aluminum and its alloys.

A further object is to provide a solution of the above character which will be neutral, thereby to eliminate corrosive or rusting action and have no effect upon fabrics or clothing with which it may accidentally come in contact.

A further object is to provide a solution of the above character especially adapted for cleaning and tinning soldering copper and which may be used in painted surfaces without the necessity of first removing the paint.

A further object is to provide a solution of the above character which may be inexpensively manufactured or compounded and which will always be ready for use.

Other objects will be in part obvious and in part hereinafter pointed out in connection with the following analysis of the invention.

*Formula for Hull's crystal soldering solution.*

*A solution.* — Antimony trioxide, 20 grammes; hydrochloric acid, 1000 cc.

*B solution.*—Hydrochloric acid, 100 cc.; solution A, 5 cc.

Take of B solution 1500 cc.; cut zinc to saturation (zinc chloride), forming solution C.

Per cent.

Solution C _____ 15
Glycerine _____ 25
Water _____ 60

It is to be understood, however, that I do not wish to be limited to this exact formula for variations therein may be desirable in treating or soldering different metals. This solution being free from acid, it is perfectly safe to handle under all conditions and being fluid to a high degree will readily spread throughout the surface to be soldered or cleaned and enter all cracks and crevices thereby forming a better flux for the solder and cause it to adhere tightly to the entire surface to which it is applied.

It is believed to be unnecessary to inform those skilled in the art of the manner in which the material is used, as it is merely applied to the surface to be soldered and the heated solder applied thereto in a well-known manner.

What is claimed is:—

1. A solution of the above character containing antimony trioxide, zinc chloride and glycerine.

2. A soldering solution containing antimony trioxide, zinc chloride and glycerine mixed together in the presence of water.

3. A soldering solution having approximately 15% of zinc chloride and antimony trioxide in solution mixed with 25% of glycerine in excess water.

In testimony that I claim the foregoing as my own, I have hereto affixed my signature.

CLOICE B. HULL.